United States Patent
Hutz et al.

(10) Patent No.: US 10,546,483 B1
(45) Date of Patent: *Jan. 28, 2020

(54) INTERPRETING PRESENCE SIGNALS USING HISTORICAL DATA

(71) Applicant: Alarm.com Incorporated, Tysons, VA (US)

(72) Inventors: David James Hutz, Herndon, VA (US); Kyle Rankin Johnson, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,717

(22) Filed: Apr. 22, 2019

Related U.S. Application Data

(63) Continuation of application No. 15/998,984, filed on Aug. 20, 2018, now Pat. No. 10,276,032, which is a continuation of application No. 15/167,633, filed on May 27, 2016, now Pat. No. 10,054,329.

(60) Provisional application No. 62/168,236, filed on May 29, 2015.

(51) Int. Cl.
  *G08B 25/00* (2006.01)
  *F24F 11/30* (2018.01)
  *G05B 15/02* (2006.01)
  *F24F 11/56* (2018.01)

(52) U.S. Cl.
  CPC .......... *G08B 25/008* (2013.01); *F24F 11/30* (2018.01); *G05B 15/02* (2013.01); *G08B 25/002* (2013.01); *F24F 11/56* (2018.01); *G05B 2219/2642* (2013.01)

(58) Field of Classification Search
  CPC .................................. G05B 1/00; G05F 1/00
  See application file for complete search history.

(56) References Cited

U.S. PATENT DOCUMENTS

| | | | |
|---|---|---|---|
| 8,786,425 B1 | 7/2014 | Hutz | |
| 9,013,294 B1* | 4/2015 | Trundle | G08B 25/001 340/501 |
| 9,818,291 B2* | 11/2017 | Hua | G08B 25/016 |
| 10,054,329 B1 | 8/2018 | Hutz | |
| 2007/0262857 A1 | 11/2007 | Jackson | |
| 2009/0027196 A1 | 1/2009 | Schoettle | |
| 2013/0098596 A1* | 4/2013 | Fisher | G05D 23/1904 165/237 |
| 2014/0282048 A1 | 9/2014 | Shapiro | |
| 2015/0088272 A1 | 3/2015 | Drew | |

(Continued)

*Primary Examiner* — Shirley Lu
(74) *Attorney, Agent, or Firm* — Fish & Richardson P.C.

(57) ABSTRACT

A method includes obtaining historical event data for events detected over a past period of time by sensors within a property, receiving a set of current event data for one or more events detected by one or more of the sensors within the property, determining that the set of current event data matches a pattern of events indicated by the historical event data, generating, based on the pattern of events, a confidence score for the set of current event data, wherein the confidence scores reflects a confidence that a person is not within the property, determining that the confidence score satisfies a confidence threshold associated with an action to be performed when a person is not within the property, and triggering execution of the action.

20 Claims, 6 Drawing Sheets

(56) References Cited

U.S. PATENT DOCUMENTS

2015/0323915 A1\* 11/2015 Warren ................. G05B 15/02
                                                    700/275
2016/0187127 A1   6/2016 Purohit
2016/0189509 A1   6/2016 Malhotra
2016/0261932 A1   9/2016 Fadell \* cited by examiner

400

| | Detected Pattern | Confidence |
|---|---|---|
| 430 | Front door opening followed by no activity at home; Mon – Thurs; 8 AM to 5 PM | 90 |
| 440 | Back door open preceded by interior motion detection and followed by opening of back door within five minutes | 60 |
| 450 | Interior motion detection followed by front door opening followed by interior motion detection; Sat – 10 AM to 11 AM | 95 |
| 460 | Garage side door opening preceded by interior motion detection and followed shortly with interior motion Daily between 6 AM to 7 AM and 10 PM and 11 PM | 100 |
| 470 | Opening of any door followed with lack of activity on Sunday between 8 AM and 12 PM | 80 |

FIG. 4

INTERPRETING PRESENCE SIGNALS USING HISTORICAL DATA

CROSS-REFERENCE TO RELATED APPLICATION

This application is a continuation of U.S. application Ser. No. 15/998,984, filed Aug. 20, 2018, now allowed, which is a continuation of U.S. application Ser. No. 15/167,633, filed May 27, 2016, now U.S. Pat. No. 10,054,329, issued Aug. 21, 2018, which claims the benefit of U.S. Provisional Application Ser. No. 62/168,236, filed May 29, 2015. All of these prior applications are incorporated by reference in their entirety.

TECHNICAL FIELD

This disclosure relates to monitoring technology.

BACKGROUND

Many people equip homes and businesses with alarm systems to provide increased security for their homes and businesses. Alarm systems may include control panels that a person may use to control operation of the alarm system and sensors that monitor for security breaches and other events. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for monitoring technology. For example, techniques are described for interpreting presence signals based on historical data.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIG. 4 illustrates an example data record for interpreting presence signals based on historical data.

DETAILED DESCRIPTION

Techniques are described for interpreting presence signals based on historical data. For instance, a monitoring system may determine that a front door opening at 8 AM on a weekday is associated with a user leaving home for an extended period of time based on a pattern in historical data that includes past monitoring activity associated with a front door opening at 8 AM on weekdays followed by no interior home activity until 5 PM. Presence signals may be signals that are associated with presence of a user at home. For example, presence signals may include signals from door sensors indicating opening and closing of doors, signals from motion sensors indicating detected motion or lack of detected motion, signals from a user's phone indicating a location of the user, or signals from other sensors.

The determination of whether a user is home at a property may be difficult for a monitoring system to determine just based on presence signals. For example, if a user opens a door to see what the weather is like, closes the door, and then reads a book inside the home, the monitoring system may detect a lack of motion after the door opens, but may not be certain whether the lack of motion is due to the user leaving the home through the door or the user not leaving through the door but also not moving through the home. The historical data may help the monitoring system determine whether presence signals of a front door opening at a particular time of day should be interpreted as a user leaving a home or a user staying at home. For example, if historical data indicates a pattern that at the particular time of day, a front door opening results in no motion detected until the front door opens again hours later, e.g., when the user leaves the home and comes home later, then the monitoring system may interpret a front door opening at the particular time of day as the user leaving the home. In another example, if historical data indicates a pattern that at the particular time of day, a front door opening results in motion detected before the front door opens again, e.g., when the user opened a front door but didn't leave the home, then the monitoring system may interpret a front door opening at the particular time of day as the user either staying at home or coming home.

The monitoring system may perform actions in response to the interpretation of the presence signals based on a pattern in past monitoring activity. For example, the monitoring system may send an alert to the user indicating that the user did not arm the alarm system or did not turn off a stove, control a heating, ventilating, and air conditioning (HVAC) system, or control some other device in the home to perform an operation.

Figure 1:
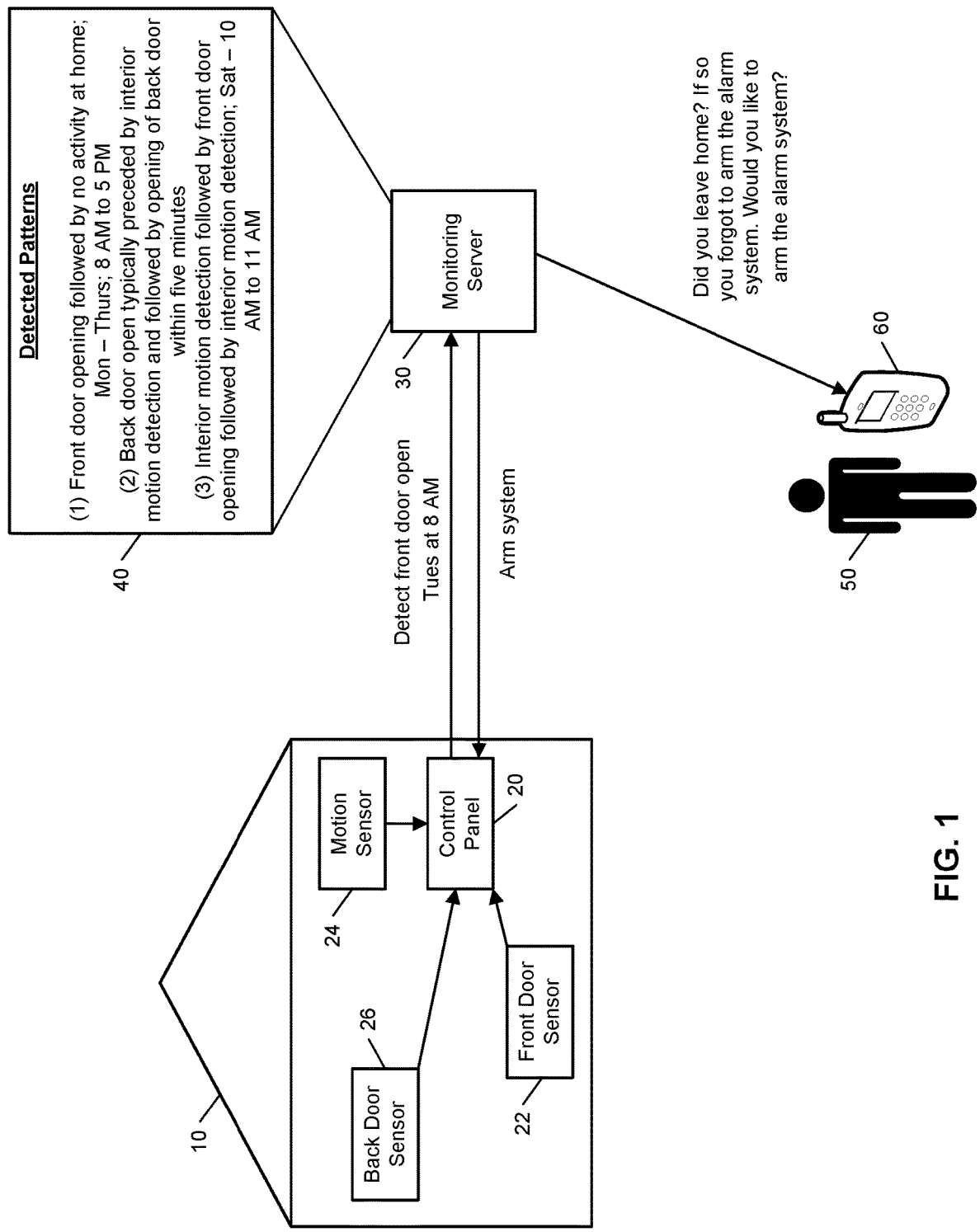
FIG. 1 illustrates an example system interpreting presence signals based on historical data.

FIG. 1 illustrates an example of interpreting presence signals based on a pattern in past monitoring activity. As shown in FIG. 1, a property 10 (e.g., a home) of a user 50 is monitored by an in-home monitoring system (e.g., in-home security system) that includes components that are fixed within the property 10. The in-home monitoring system includes a control panel 20, a front door sensor 22, a motion sensor 24, and a back door sensor 26. The front door sensor 22 is a contact sensor positioned at a front door of the property 10 and configured to sense whether the front door is in an open position or a closed position. The motion sensor 24 is configured to sense a moving object within the property 10. The back door sensor 26 is a contact sensor positioned at a back door of the property 10 and configured to sense whether the back door is in an open position or a closed position.

The control panel 20 communicates over a short-range wired or wireless connection with each of the front door sensor 22, the motion sensor 24, and the back door sensor 26 to receive sensor data descriptive of events detected by the front door sensor 22, the motion sensor 24, and the back door sensor 26. The control panel 20 also communicates over a long-range wired or wireless connection with a monitoring server 30. The monitoring server 30 is located remote from the property 10 and manages the in-home monitoring system at the property 10, as well as other (and, perhaps, many more) in-home monitoring systems located at different properties that are owned by different users. In some implementations, the functionality of the monitoring server 30 may be incorporated into the control panel 20. The monitoring server 30 receives, from the control panel 20, sensor data descriptive of events detected by the sensors included in the in-home monitoring system of the property 10.

In the example shown in FIG. 1, the monitoring server 30 collects and aggregates sensor data received from the control panel 20 over a period of time. The period of time may be relatively long and may include sensor data collected over the course of several days, several weeks, several months, and even several years. And, the aggregated sensor data may include all events sensed by the in-home monitoring system during the period of time, regardless of whether the in-home monitoring system was armed in a manner in which the in-home monitoring system detects alarm conditions when the events occurred. The monitoring server 30 analyzes the aggregated sensor data with other data available to the monitoring server 30, such as location data for the user 50, and, based on the analysis, detects patterns of recurring events within the aggregated sensor data and the other data available to the monitoring server 30. The recurring events may be positive events tied to activity in the property detected by the in-home monitoring system or may be negative events that reflect a lack of activity (or a lack of a particular type of activity) in the property detected by the in-home monitoring system.

After detecting patterns of recurring events within the aggregated sensor data and the other data available to the monitoring server 30, the monitoring server 30 stores the detected patterns 40 in electronic storage accessible to the monitoring server 30. As shown in the detected patterns 40, the monitoring server 30 has detected a pattern that, on Monday to Thursday between eight in the morning and five in the afternoon, after a front door opens no activity at the property 10 is detected, e.g., a user leaving for work at eight in the morning and no one being home until after five in the afternoon. The monitoring server 30 also has detected a pattern that a back door open event detected by the back door sensor 26 is typically proceeded by an interior motion detection by the motion sensor 24 and followed by the opening of the back door within five minutes, e.g., user opens back door of home to throw trash away and opens the back door again to re-enter home. The monitoring server 30 further has detected a pattern that, on Saturday in the morning from ten to eleven interior motion detection is followed by front door opening followed by interior motion detection, e.g., user opens front door to pick up newspaper without closing the door.

The monitoring server 30 uses the detected patterns 40 to perform operations related to the in-home monitoring system. For example, in the example shown in FIG. 1, the control panel 20 detects a front door open event on a Tuesday at 8 AM based on output from the front door sensor 22. The control panel 20 sends a message to the monitoring server 30 indicating detection of the front door open event on Tuesday at 8 AM. The monitoring server 30 receives the message from the control panel 20 and compares the front door open event on Tuesday at 8 AM with the detected patterns 40 that were automatically identified by the monitoring server 30 based on past sensor and other activity collected by the monitoring server 30. Based on the comparison, the monitoring server 30 determines that the front door open event on Tuesday at 8 AM indicates that the user likely left home for an extended duration.

Based on determining that the user likely left home, the monitoring server 30 performs actions. For example, as shown, the monitoring server 30 may determine that the alarm system is not armed and send an alert to a mobile phone 60 of the user 50 indicating that the user 50 may have forgotten to arm the alarm system and asking the user 50 to confirm the user 50 is not at the property 10 and indicate whether the user 50 would like to arm the alarm system.

The user 50 may view the alert on the mobile phone 60 and take action with respect to the front door opening. For example, the user 50 may provide user input indicating that the user 50 actually is at the property 10 or does not want to arm the alarm system. In this example, the mobile phone 60 receives the user input provided by the user 50 and communicates the received user input to the monitoring server 30. The monitoring server 30 receives the user input from the mobile phone 60 and, in this case, that user 50 is not home and does want to arm the alarm system.

In some implementations, based on the monitoring server 30 determining that the user has likely left home, the monitoring server 30 may provide an indication that the user has likely left the property 10 to the control panel 20. In response to receiving the indication, the control panel 20 may control the HVAC system of the property 10 to reduce usage. For example, the control panel 20 may reduce a heating of the property 10 to a preset temperature when the user is not present or reduce a cooling of the property 10 to a present temperature when the user is not present.

In some implementations, the monitoring server 30 may use the detected patterns 40 to determine not to perform operations related to the in-home monitoring system. For example, the control panel 20 may detect interior motion followed by a back door opening. The control panel 20 sends a message to the monitoring server 30 indicating detection of interior motion followed by a back door opening. The monitoring server 30 receives the message from the control panel 20 and compares the interior motion and back door open event with the detected patterns 40 that were automatically identified by the monitoring server 30 based on past sensor and other activity collected by the monitoring server 30. For example, the monitoring server 30 may determine that the interior motion and back door open event matches a pattern of the user staying at home. Based on the comparison, the monitoring server 30 determines that the interior motion followed by the back door opening indicates that the user will stay at home and determine to take no action. In some implementations, when the monitoring server 30 determines to take no action because a user is determined to have stayed at home, the monitoring server 30 may determine the expected duration before receiving a presence signal indicating the user is present, e.g., before motion of the user is detected, based on the patterns, and determine the user is actually not present if a present signal indicating the user is present is not received by a waiting duration based on the expected duration. For example, the waiting duration may be two times, three times, or five times the expected duration.

In another example, the monitoring server 30 may determine that the interior motion and back door open event matches a pattern of the user leaving the home by the back door for five minutes. Based on the comparison, the monitoring server 30 determines that the interior motion followed by the back door opening indicates that the user will likely be gone for only five minutes, and in response, determine to take no action. In some implementations, when the monitoring server 30 determines to take no action because a user is determined to have left but is expected to quickly return, the monitoring server 30 may determine the expected duration that the user will be gone based on the patterns, and determine that the user is actually not present if the user does not return by a waiting duration based on the expected duration. For example, the waiting duration may be two times, three times, or five times the expected duration.

Figure 2:
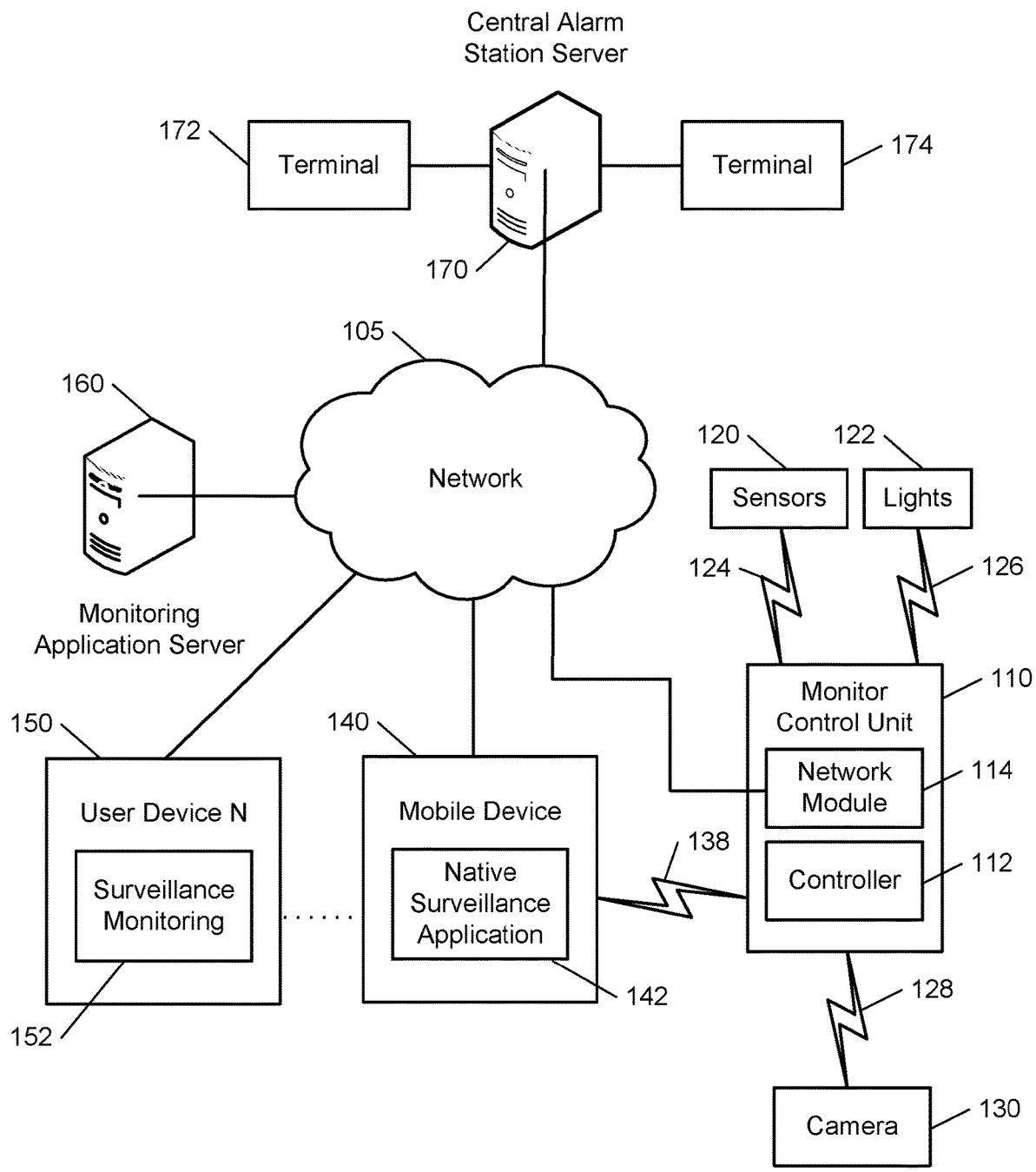
FIG. 2 illustrates an example system interpreting presence signals based on historical data.

FIG. 2 illustrates an example of a system 200 configured to provide surveillance and reporting. The system 200 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring application server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance or monitoring. The module 122 is connected to one or more lighting systems and is configured to control operation of the one or more lighting systems. The module 122 may control the one or more lighting systems based on commands received from the monitoring system control unit 110. For instance, the module 122 may cause a lighting system to illuminate an area to provide a better image of the area when captured by a camera 130.

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring system control unit 110. The camera 130 may employ a small solar cell to recharge the battery when light is available. Alternatively, the camera 130 may be powered by the controller's 112 power supply if the camera 130 is co-located with the controller 112.

The sensors 120, the module 122, and the camera 130 communicate with the controller 112 over communication links 124, 126, and 128. The communication links 124, 126, and 128 may be a wired or wireless data pathway configured to transmit signals from the sensors 120, the module 122, and the camera 130 to the controller 112. The sensors 120, the module 122, and the camera 130 may continuously transmit sensed values to the controller 112, periodically transmit sensed values to the controller 112, or transmit sensed values to the controller 112 in response to a change in a sensed value.

The communication link 128 over which the camera 130 and the controller 112 communicate may include a local network. The camera 130 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 160 is an electronic device configured to provide monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 is an electronic device configured to provide alarm monitoring service by exchanging communications with the monitoring system control unit 110, the one or more user devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more user devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 2 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interface and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 2 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as wifi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, and the camera 130. The one or more user devices 140, 150 receive data directly from the sensors 120, the module 122, and the camera 130 and sends data directly to the sensors 120, the module 122, and the camera 130. The one or more user devices 140, 150 provide the appropriate interfaces/processing to provide visual surveillance and reporting.

In other implementations, the system 200 further includes network 105 and the sensors 120, the module 122, and the camera 130 are configured to communicate sensor and image data to the one or more user devices 140, 150 over network 105 (e.g., the Internet, cellular network, etc.). In yet another implementation, the sensors 120, the module 122, and the camera 130 (or a component, such as a bridge/router) are intelligent enough to change the communication pathway from a direct local pathway when the one or more user devices 140, 150 are in close physical proximity to the sensors 120, the module 122, and the camera 130 to a pathway over network 105 when the one or more user devices 140, 150 are farther from the sensors 120, the module 122, and the camera 130. In some examples, the system leverages GPS information from the one or more user devices 140, 150 to determine whether the one or more user devices 140, 150 are close enough to the sensors 120, the module 122, and the camera 130 to use the direct local pathway or whether the one or more user devices 140, 150 are far enough from the sensors 120, the module 122, and the camera 130 that the pathway over network 105 is required. In other examples, the system leverages status communications (e.g., pinging) between the one or more user devices 140, 150 and the sensors 120, the module 122, and the camera 130 to determine whether communication using the direct local pathway is possible. If communication using the direct local pathway is possible, the one or more user devices 140, 150 communicate with the sensors 120, the module 122, and the camera 130 using the direct local pathway. If communication using the direct local pathway is not possible, the one or more user devices 140, 150 communicate with the sensors 120, the module 122, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some implementations, one or more of the components of the system 200 (e.g., the monitoring application server 160) may be configured to interpret presence signals based on historical data. The system 200 may consider any inputs and data related to the system 200 to interpret presence signals. For instance, the inputs to the system 200 may include one or more of historical sensor data, current status of the security system, other current status information, car or smartphone locations, customer's historical responses to alerts, a customer-specified level of sensitivity/risk for each sensor, and some measure of how much false alarms bother them.

The system 200 may provide any type of output or report based on interpreting presence signals. For example, the output of the system 200 may be an alert that includes the event(s) that triggered the alert, some measure of how confident the system 200 is that the user is not present at the property 10, some actions the user can take. In another example, the system 200 may control a HVAC of the property 10 based on determining that the user is not present based on interpreting presence signals.

The interpretation of presence signals may be run on the panel/firmware, on the backend, or on any other suitable component of the security system. In some examples, functionality of the interpretation of presence signals may be distributed among various components of the security system such that some functionality may be implemented by the panel/firmware and other functionality may be implemented by the monitoring server.

In some implementations, all of the processing described throughout this disclosure may be implemented in a monitoring system control panel located inside the property being monitored, as opposed to sending data to an external server for processing. For example, rather than being a separate server located in a remote location, the monitoring application server 160 may be a logical component inside of the monitoring system control unit 110. In this example, the monitoring system control unit 110 performs the processing of interpretation of presence signals without having to send sensor data to a separate server separated by a network.

In other implementations, all of the processing described throughout this disclosure may be performed on a remote server (e.g., monitoring application server 160). In these implementations, the monitoring system control panel (or sensors themselves) may send sensor data to the remote server over a network and the remote server may perform all of the interpretation of presence signals. For instance, the monitoring system control unit 110 sends all captured sensor data to the monitoring application server 160 and the monitoring application server 160 performs the processing of the interpretation of presence signals.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the interpretation of presence signals collected relatively recently (e.g., sensor data collected within the past three months) and the remote server may perform the detection of patterns in sensor data collected over a longer period of time (e.g., sensor data collected over the past several years). Alternatively, the monitoring system control panel may perform pre-processing of the sensor data, including collection and aggregation of the sensor data, and the remote server may perform the detailed analysis of detecting patterns within the sensor data. In the example shown in FIG. 2, the processing described throughout this disclosure may be mixed between the monitoring system control unit 110 and the monitoring application server 160.

Figure 3:
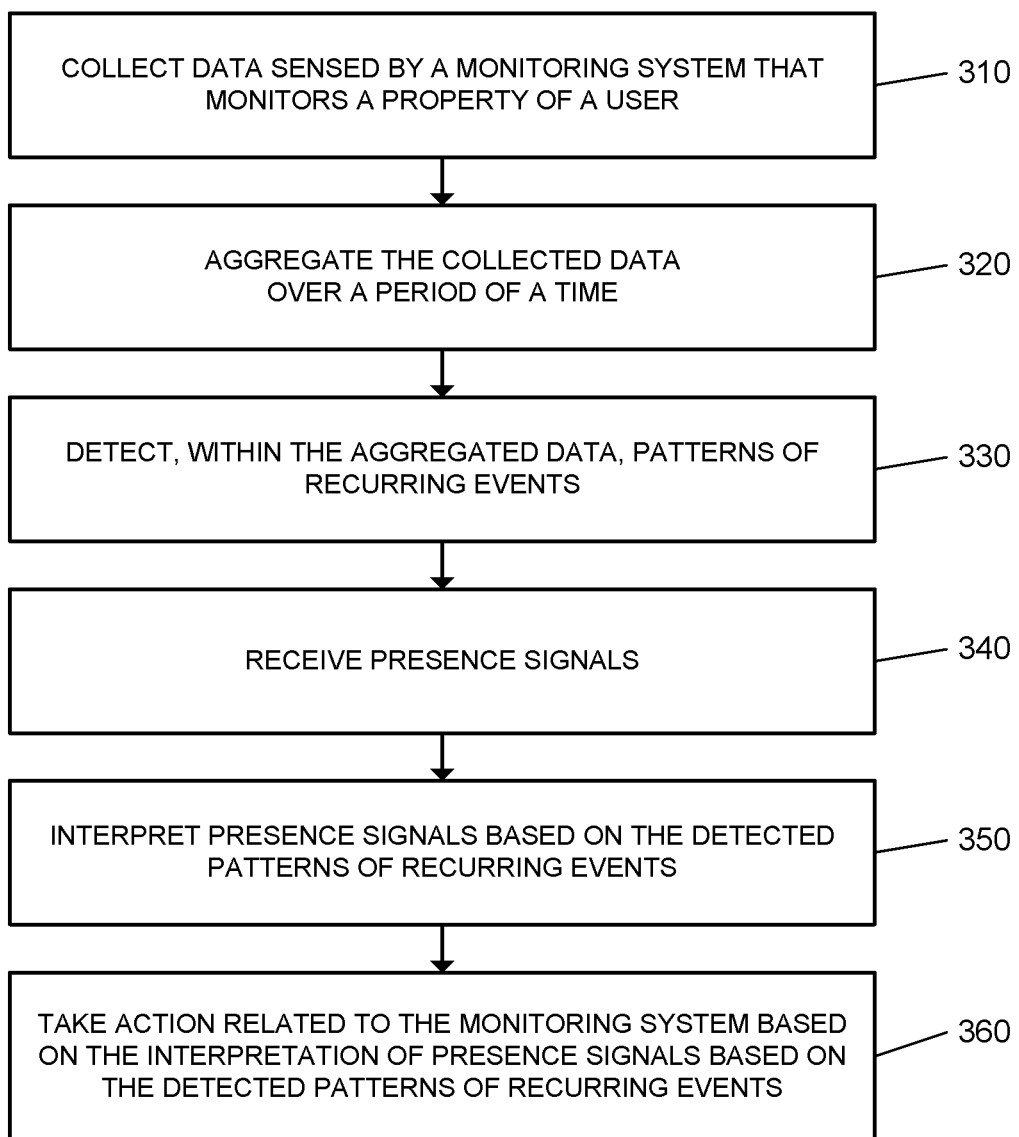
FIG. 3 is a flow chart of an example process for interpreting presence signals based on historical data.

FIG. 3 illustrates an example process 300 for interpreting presence signals based on historical data. The system 200 collects data sensed by a monitoring system that monitors a property of a user (310). For example, the system 200 receives, over a network, data describing sensor events detected by sensors fixed at the property of the user. In this example, the sensor events may be contact sensor events detected by door and window sensors located at doors and windows of the property, motion sensor events detected by motion sensors located at the property, and any other type of sensor events detected by other types described throughout this disclosure. The system 200 receives all sensor events detected by the monitoring system, regardless of whether the monitoring system is in an armed state or an unarmed state when the sensor events are detected.

The system 200 aggregates the collected data over a period of a time (320). For instance, the system 200 identifies the property and/or user associated with collected sensor events and stores sensor events collected over time for the identified property and/or user with an indication of the identified property and/or user. In this regard, the system 200 stores the collected sensor events in a manner that enables the system 200 to access all of the collected sensor events for the identified property and/or user. The system 200 may aggregate the collected sensor events over any period of time, including all sensor events collected over years, sensor events collected over a period of one or more months, sensor events collected over a period of one or more weeks, or other suitable time periods that enable the system 200 to detect recurring events in the aggregated sensor data.

The system 200 detects, within the aggregated data, patterns of recurring events (330). For instance, the system 200 analyzes the aggregated data to detect patterns of recurring sensor events in the aggregated data. The system 200 may detect events as events sensed by sensors of the monitoring system as well as a lack of sensor events detected. The system 200 may consider the timing of events, such as events that repeat on a routine basis (e.g., events that occur at the relatively same time everyday day or events that occur at the relatively same time on a particular day of the week). The system 200 also may consider orders in which events occur (e.g., a particular motion sensor event routinely precedes a particular door open event). The order of events may be considered with respect to timing or irrespective of timing.

In detecting patterns, the system 200 may consider any type of historical sensor activity detected by a monitoring system located at a property. The system 200 also may consider other types of activity, such as location data of one or more users of the monitoring system, data collected by sensors of a vehicle of one or more users of the monitoring system, weather data accessible to the monitoring system, or any other type of data that the system 200 is capable of collecting, aggregating, and analyzing.

To detect patterns within the aggregated data, the system 200 may use any type of data mining techniques capable of detecting patterns of recurring events. The system 200 may perform an automatic or semi-automatic analysis of relatively large quantities of sensor data to extract previously unknown interesting patterns, such as identifying groups of sensor events using cluster analysis, identifying unusual sensor events using anomaly detection, and identifying dependencies using association rule mining. Based on the patterns detected, the system 200 may assign a confidence score for each pattern that reflects a level of confidence that the detected pattern is actually a pattern of recurring events that will be observed in the future. The system 200 may determine the confidence score based on a percentage of time the pattern has occurred in the past, the amount of data used in detecting the pattern, and any statistical techniques that assess whether the pattern is a statistically significant pattern of recurring events.

FIG. 4 illustrates an example data record 400 that stores patterns detected within aggregated sensor data and confidence scores for each of the detected patterns. The data record 400 includes a first column 410 for a detected pattern and a second column 420 for a confidence score associated with the pattern stored in the column 410. As shown, a first detected pattern 430 indicates that the system 200 detected a pattern of a front door opening followed by a lack of sensor activity repeating Monday through Thursdays at the hours of eight in the morning to five in the afternoon. The first detected pattern 430 has a confidence score of ninety, which indicates that the pattern is likely.

A second detected pattern 440 indicates that the system 200 detected a pattern of a back door opening typically preceded by interior motion detected and followed by a back door opening with five minutes. The second detected pattern 440 has a confidence score of sixty, which indicates that the pattern is more likely than not, but not of very high confidence (e.g., every three times the back door opens and is preceded by interior motion, the back door does not open within five minutes once).

A third detected pattern 450 indicates that the system 200 detected a pattern of interior motion detection followed by front door opening followed by interior motion detection on Saturday from ten in the morning to eleven in the morning. The third detected pattern 450 has a confidence score of ninety-five, which indicates that the pattern is likely.

A fourth detected pattern 460 indicates that the system 200 detected a pattern of a garage side door opening preceded by interior motion detection and followed shortly with interior motion daily between six in the morning to seven in the morning and ten at night to eleven at night. The fourth detected pattern 460 has a confidence score of one hundred, which indicates that the pattern is very likely.

A fifth detected pattern 470 indicates that the system 200 detected a pattern of opening of any door followed with lack of activity on Sunday between eight in the morning to noon. The fifth detected pattern 470 has a confidence score of eighty, which indicates that the pattern is likely.

In some implementations, the system 200 uses a threshold confidence score in determining whether or not to interpret presence signals using a pattern. In these implementations, the system 200 may use a confidence score of sixty as a threshold (e.g., patterns that occur at least sixty percent of the time). Accordingly, patterns having a confidence score lower than sixty are not included in the data record 400 and do not impact the monitoring system, unless the pattern increases to warrant further consideration (e.g., increases to a confidence score at sixty or above).

Referring again to FIG. 3, the system 200 receives presence signals (340). For example, the system 200 may receive sensor signals from door sensors, motion detection sensors, or windows sensors. The presence signals may be substantially real-time signals, e.g., sensed less than a minute ago or thirty seconds ago from the time the presence signals are being interpreted.

The system 200 interprets the presence signals based on the detected patterns of recurring events (350). For example, the system 200 interprets a front door open event on a Tuesday at 8 AM based on a detected pattern that, on Monday to Thursday between eight in the morning and five in the afternoon, after a front door opens no activity at the property 10 is detected, e.g., a user leaving for work at eight in the morning and no one being home until after five in the afternoon, and in response, determines that the front door open event on Tuesday at 8 AM indicates that the user likely left home for an extended duration.

The system 200 takes action related to the monitoring system based on the detected patterns of recurring events (360). For instance, the system 200 may determine that the alarm system is not armed and send an alert to a mobile phone of a user indicating that the user may have forgotten to arm the alarm system and asking the user to confirm the user is not at the property and indicate whether the user would like to arm the alarm system. In another example, the system 200 may modify a temperature setting of the property from a pre-set temperature when someone is home to a pre-set temperature for when no one is present at the property.

Figure 5:
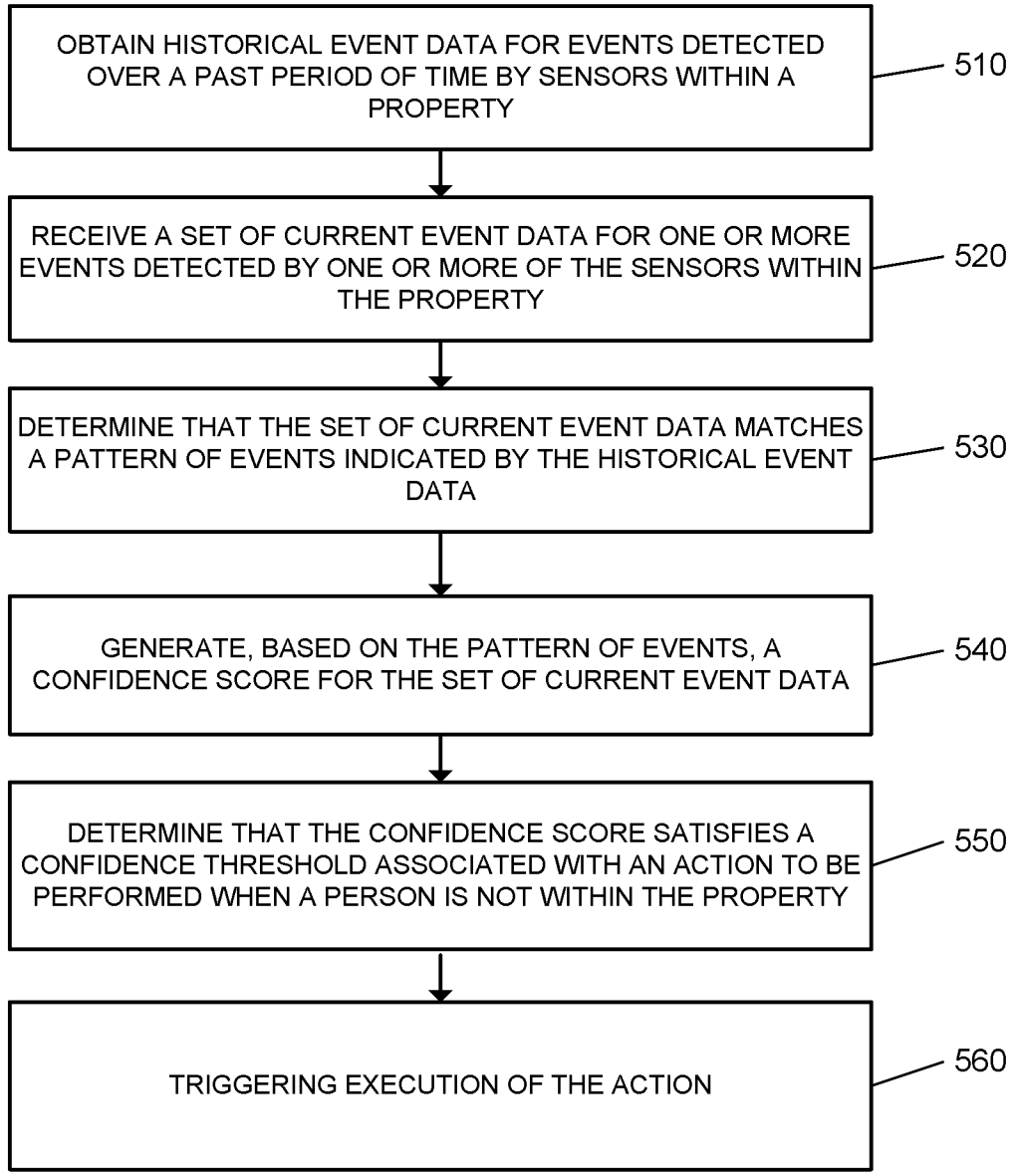
FIG. 5 is a flow chart of an example process for interpreting presence signals based on historical data.

FIG. 5 illustrates an example process 500 for interpreting presence signals based on historical data. The following describes the process 500 as being performed by components of the system 200 that are described with reference to FIG. 2. However, the process 500 may be performed by other systems or system configurations.

The system 200 obtains historical event data for events detected over a past period of time by sensors within a property (510). The one or more sensors may be contact sensors associated with doors or windows of the property, motion detector sensors, a door bell sensor, smart appliances, or a HVAC system that senses humidity and or temperature within the property. The monitoring server 30 may receive the historical event data from sensors within the property over a network. The monitoring server 30 may receive the event data when the in-home monitoring system is in an armed state, and also when the system is in a disarmed state. The sensors within the property may sense events at the property and communicate the sensed event to a control panel. The control panel 20 may then communicate the received events data and communicate the data to the monitoring server 30. The monitoring server 30 may aggregate and store the received data. The monitoring server 30 may collect the event data over a long period of time. For example, the monitoring server 30 may collect data over the cost of several days, several months, and even several years. In a particular example, the monitoring server 30 receive indications of door opening events sensed by the front door sensor 22 and motions sensed by the motion sensors 24 that reflect when motion is detected within the home and when the front door opens.

The system 200 receives a set of current event data for one or more events detected by one or more of the sensors within the property (520). The current event data may be received from a subset of the sensors within the property within a predetermined time period. The predetermined time period may be a shorter time period when compared to the time period for collecting the historical data. In some examples, the current event data may be data received within the past day, the past hours, or the past minutes. The monitoring server 30 may be configured to analyze the current event data when the system receives data that may indicate that a user has entered or exited the monitored property. For example, the monitoring server 30 may be prompted to evaluate the current event data based on receiving event data from a contact sensor associated with one or more doors, or one or more windows at the property.

The system determines that the set of current event data matches a pattern of events indicated by the historical event data (530). The monitoring server 30 of the system may identify patterns of events based on the received historical event data. In more detail, the monitoring server 30 may aggregate and store in electronic storage all the sensor event data collected over time for the property. The monitoring server 30 may aggregate the collected event data for any suitable period of time. For example, the monitoring server 30 may aggregate the sensor data collected over the years, over a couple months, a couple days, or a couple hours. The monitoring server 30 may use a variety of different data mining techniques to detect reoccurring patterns in the aggregated event data. The monitoring server 30 may perform an automatic or semi-automatic analysis of relatively large quantities of sensor data to extract previously unknown interesting patterns. In some examples, the monitoring server 30 may use cluster analysis to identify groups of sensor events. The monitoring server may use anomaly detection to identify any usual sensor events, and may use association rule mining to identify dependencies. In some examples, the monitoring server may use any appropriate method of dating mining to identify patterns in the events data.

The system may utilize other forms of data in conjunction with the received event data. For example, the monitoring server 30 may use location information of one or more users associated with the property. In these examples, the monitoring server 30 may receive user location information for each of the one or more users associated with the property, and may use the received location information, and the event data to identify patterns in the event data. The monitoring server 30 may utilize data collected by sensors of a vehicle of one or more of the users associated with the property, received weather data, or any other suitable types of data that the system receives. The system may aggregate all the received data and analyze the aggregated data to identify the recurring event data. The monitoring server 30 may identify that the set of current event data matches a pattern of events by determining that the set of current data matches a pattern of events that reoccurs multiple times throughout the received historical event data. The monitoring server 30 may consider the timing of events, such as events that repeat on a routine basis (e.g., events that occur at the relatively same time everyday day or events that occur at the relatively same time on a particular day of the week). The monitoring server 30 may also consider the order in which events occur (e.g., a particular motion sensor event routinely precedes a particular door open event). The order of events may be considered with respect to timing or irrespective of timing. The monitoring server may store the identified patterns in electronic storage accessible to the monitoring server.

The system generates a confidence score for the set of current event data based on the pattern of events (540). The generated confidence score reflects a confidence that a person is not within the property. The monitoring server 30 may determine a confidence score for the set of current event data based on how closely the received current event data matches the pattern of events identified. For example, the monitoring server 30 may identify a pattern of events in historical event data where the front door opens at 5 AM preceded by interior motion detection, and followed by no interior motion detection, then the opening of the front door again at 6 AM followed by interior motion detection on Mondays, Wednesdays, and Fridays. In this example, the monitoring server 30 may receive a set of current event data on a Wednesday, where the front door opens at 5:20 AM preceded by interior motion detection. The monitoring server 30 may generate a confidence score of 85% for the current event data based on the data matching a day of the week the pattern occurred in the past, and the similarity of the door open events. In another example, the monitoring server 30 may receive a set of current event data on a Tuesday, where the front door opens at 5:20 AM preceded by interior motion detection. In this example, the generated confidence score may be 50% based on the current event data only including similar door open events but not matching the day of the week the pattern occurred in the past.

The monitoring server 30 may generate a confidence score for a set of current event data based on determining how often the identified pattern of events is followed by detecting that no one is at the property. The confidence score assigned for a set of current event data may be high when the set of current event data matches an identified pattern within the historical event data that is frequently followed by the system detecting that no one is present at the property. For example, the monitoring server 30 may assign a confidence score of 95% for a set of current event data that matches an identified pattern within the historical event data where 95% of the time the pattern occurs no one was at the property. In another example, the monitoring server 30 may assign a confidence score of 70% for a set of current event data that matches an identified pattern within the historical event data where 70% of the time the pattern occurs no one was at the property. The monitoring server 30 may utilize location data and or data collected by sensors of a vehicle of one or more users associated with the property, along with the historical event data to detect whether no one is present at the property. For example, the monitoring server 30 may detect a pattern of events where the front door opens at 8 AM followed by no activity at the property on Mondays to Fridays. The monitoring server 30 may use location information associated with a mobile device of the user associated with the property to determine that the user was not at the property between the hours of 8 AM and 5 PM. The monitoring server 30 may use the data collected from one or more sensors associated with the user's vehicle to determine the user was not at the property. For example, the monitoring server may receive location information from sensors on the vehicle that indicate that the vehicle is not located at the property. In some implementations, the longer no motion is sensed in the property the higher the confidence score. For example, the monitoring server 30 may determine that a front door opening Monday morning at 8 AM is associated with a confidence score of 70% and every minute that no activity is sensed within the home, the current event data may be matched with patterns with higher and higher confidence scores, e.g., a front door opening Monday morning at 8 AM is matched with a pattern associated with a confidence score of 70%, a front door opening Monday morning at 8 AM and no motion for five minutes is matched with a pattern associated with a confidence score of 75%, a front door opening Monday morning at 8 AM and no motion for fifteen minutes is matched with a pattern associated with a confidence score of 90%.

In some implementations, the monitoring server 30 may generate a low confidence score for a set of current event data based on determining that additional data that will provide a significantly greater confidence of whether no one is home is likely to be received within a short period of time. In more detail, the monitoring server 30 may receive a set of current event data that may match the first few events of an identified pattern of events within the historical data, and may assign a low confidence score to the set of current event data. The monitoring server 30 may assign a low confidence score to the set of events data to ensure that the system takes no action based on the received set of current event data. Accordingly, the monitoring server 30 may wait until the set of received current event data matches all the events of the identified pattern of events and assign a higher confidence score to the complete set of data. For example, the system may receive a set of current event data which indicates that the back door was opened at 7 PM preceded by interior motion detection. The current event data may partially match a pattern of events which detects the back door being opened at 7 PM daily preceded by interior motion detection, and followed by receiving location information of the user device that indicates the user is not within the property. The monitoring server 30 may assign a score of 50% based on the set of current event data, and may wait until the system receives the location information that indicates the user is not located within the property to assign a confidence score of 98%.

The monitoring server 30 determines that the confidence score satisfies a confidence threshold associated with an action to be performed when a person is not within the property (550). The monitoring server 30 may associate a confidence threshold with each of one or more actions that may be performed when no one is at home. The monitoring server 30 may compare the generated confidence score to each of the one or more confidence thresholds to determine which of the one or more confidence thresholds is satisfied. The monitoring server 30 may assign a high confidence threshold for arming the alarm system at the property when the system detects that no one is at home. For example, the confidence threshold for arming the alarm system when the system detects that no one is at home may be 95%. In some implementations, the system may be configured to implement any other suitable action when no one is detected to be at home. In some examples, the monitoring server 30 may assign a confidence threshold for setting the temperate on an HVAC system at the property to a cost saving setting. For example, the confidence threshold for setting the temperate on the HVAC to the cost saving setting may be 70%. Other actions with respective confidence thresholds that may be triggered by the monitoring server 30 may include, for example, turning off lights, dimming lights, turning off appliances, putting appliances on sleep mode, increasing sensitivity of motion sensors, etc.

The monitoring server 30 may assign a confidence threshold to an action based on evaluating a cost versus convenience rating of performing the corresponding action. The monitoring server 30 may be configured to perform an action based on how convenient performing the action may be to the users at the property, while also taking into consideration the cost benefit of performing said the action. The monitoring server 30 may consider the cost versus confidence factor when assigning a confidence threshold for an action, along with the other factors considered for assigning a confidence threshold for a specific action. For example, the monitoring server 30 may be designed to switch off one or more smart light bulbs at the property, based on determining that no one is at home, in an effort to reduce energy consumption. In this example, the monitoring server 30 may determine that the energy saved may outweigh any inconvenience that may be caused to a user if the user was indeed at home even though the system may have incorrectly determined no one was at home. The monitoring server 30 may therefore assign a relatively low or medium confidence threshold for the action of switching off the lights at the property. In some implementations, the user may have the ability to set the cost versus convenience rating for performing a particular action. For example, the user may set the cost versus convenience rating for switching off the lights at the monitored property. The cost versus convenience rating for setting the HVAC to a cost saving setting may be a cost versus comfort rating. In this case, the user may have the ability to set the cost versus comfort rating for adjusting the settings of the HVAC system.

The cost versus convenience rating may vary based on the period of time the user is expected to be away from the property. For example, the cost versus convenience rating for switching off the lights at the property may be different if the user is expected to return home within the hour versus the user being expected to return home within five minutes. In cases, it may be determined to be more cost effective to take no action instead of switching the lights off when the user is expected to return home within a short time period. The monitoring server 30 may assign a high confidence threshold for arming the alarm system when it detects that no one is at home based on the evaluated convenience versus cost rating. The monitoring server 30 may determine that the inconvenience caused by arming the alarm system at the property when a user is mistakenly detected not to be at home outweighs any cost benefit of arming the alarm system.

The system triggers execution of the action in response to determining that the confidence score satisfies a confidence threshold associated with an action to be performed when a person is not within the property (560). The monitoring server 30 may compare the generated confidence score to each of the one or more confidence thresholds for the actions that may be executed by the system. In some implementations, the system may perform each of the one or more actions that satisfy the respective confidence thresholds. For example, the monitoring server 30 may generate a confidence score of 90%, this generated confidence score may exceed the confidence threshold of 70 for setting the HVAC to the cost saving setting, and may also exceed the confidence threshold of 60% for switching off the lights at the property. In this example, the monitoring server 30 may execute both actions based on both confidence thresholds being exceeded by the generated confidence score.

While the above describes the monitoring server 30 performing the process 500, the process 500 may also be performed by the control panel 20 alone or in combination with the monitoring server 30. For example, the control panel 20 may determine to turn off lights based on determining that current event data from sensors matches a pattern of no one being home and has a confidence score of 70% which satisfies a confidence threshold of 60% for turning off lights.

In some implementations, the monitoring server 30 may additionally or alternatively determine that a property will only be briefly occupied and, in response, determine not to perform actions that would otherwise be performed when the property is occupied. For example, the monitoring server 30 may determine that a house keeper has entered the property and will only be in the property for thirty minutes and, in response, determine not to turn on the HVAC system which the monitoring server 30 may otherwise turn on when the property will be occupied for a longer duration. The monitoring server 30 may determine that the property will only be briefly occupied based on matching current event data with historical patterns similarly to how the monitoring server 30 may determine that the property is not occupied. For example, the monitoring server 30 may determine that a front door has opened at 2 PM on a weekday, determine that the front door opening at 2 PM on a weekday matches a pattern where the property is only occupied for thirty minutes and, in response, determine that the property will only be briefly occupied and determine not to turn on a HVAC unit.

Figure 6:
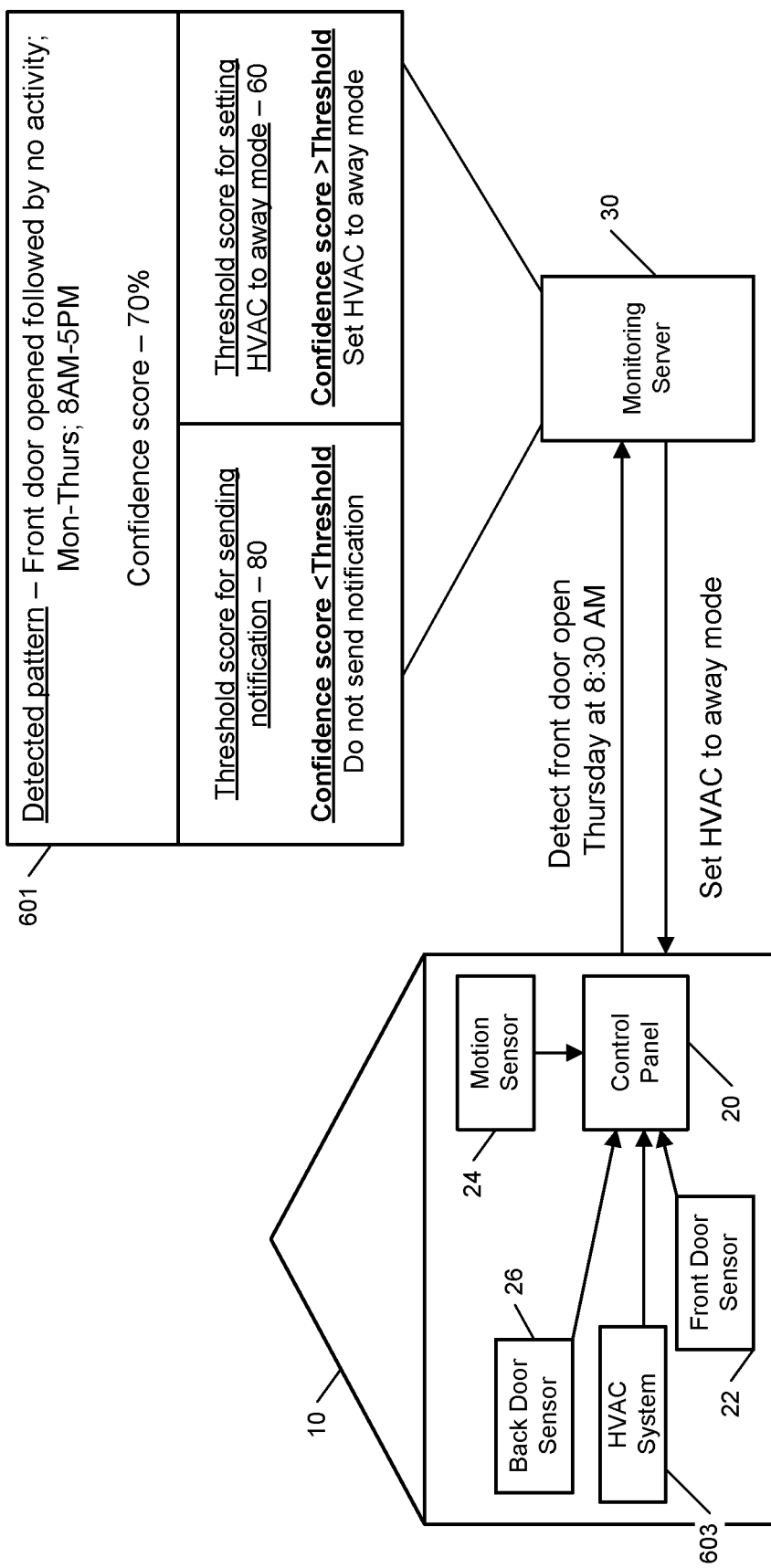
FIG. 6 illustrates an example system interpreting presence signals based on historical data.

FIG. 6 illustrates an example of interpreting presence signals based on a pattern in past monitoring activity. As shown in FIG. 6, a property 10 (e.g., a home) of a user is monitored by an in-home monitoring system (e.g., in-home security system) that includes components that are fixed within the property 10. The in-home monitoring system includes a control panel 20, a front door sensor 22, a motion sensor 24, a back door sensor 26, and a HVAC system 603. The front door sensor 22 is a contact sensor positioned at a front door of the property 10 and configured to sense whether the front door is in an open position or a closed position. The motion sensor 24 is configured to sense a moving object within the property 10. The back door sensor 26 is a contact sensor positioned at a back door of the property 10 and configured to sense whether the back door is in an open position or a closed position. In some examples, the in-home monitoring system may include one or more smart appliances, one or more smart lightbulbs, or any other suitable electronic sensors.

The control panel 20 communicates over a short-range wired or wireless connection with each of the front door sensor 22, the motion sensor 24, the back door sensor 26, and the HVAC system 603 to receive sensor data descriptive of events detected by the front door sensor 22, the motion sensor 24, the back door sensor 26, and the HVAC system 603. The control panel 20 also communicates over a long-range wired or wireless connection with a monitoring server 30. The monitoring server 30 is located remote from the property 10 and manages the in-home monitoring system at the property 10, as well as other (and, perhaps, many more) in-home monitoring systems located at different properties that are owned by different users. The monitoring server 30 receives, from the control panel 20, sensor data descriptive of events detected by the sensors included in the in-home monitoring system of the property 10. In some implementations, the monitoring server 30 may be located at the property 10.

In the example shown in FIG. 6, the monitoring server 30 collects and aggregates sensor data received from the control panel 20 over a period of time. The system collects data over the course of several days, several weeks, several months, and even several years. The aggregated sensor data may include all events sensed by the in-home monitoring system during the period of time, regardless of whether the in-home monitoring system was armed in a manner in which the in-home monitoring system detects alarm conditions when the events occurred. The monitoring server 30 analyzes the aggregated sensor data with other data available to the monitoring server 30, such as location data for the user 50, and, based on the analysis, detects patterns of recurring events within the aggregated sensor data and the other data available to the monitoring server 30. The recurring events may be positive events tied to activity in the property detected by the in-home monitoring system or may be negative events that reflect a lack of activity (or a lack of a particular type of activity) in the property detected by the in-home monitoring system.

For the example illustrated in FIG. 6, the monitoring server 30 obtains historical event data for events detected over a past period of time by the one more sensors at the property 10. The sensors within the property sense events associated with the property and communicate the sensed events to the control panel 20. The control panel 20 then communicates the received events data to the monitoring server 30. The control panel 20, the sensors 22, 24, 26, the HVAC system 603, and the monitoring server 30 communicate over a network. The monitoring server 30 receives the event data when the in-home monitoring system is in an armed state, and also when the system is in a disarmed state. The monitoring server 30 collects the historical event data over a long period of time. For example, the monitoring server 30 may collect data over the cost of several days, several months, and even several years.

The monitoring server 30 aggregates the received historical events data, and uses a variety of different data mining techniques to detect reoccurring patterns in the historical events data. In some implementations, the monitoring server 30 performs an automatic or semi-automatic analysis of relatively large quantities of sensor data to extract previously unknown interesting patterns, or uses cluster analysis to identify groups of sensor events. The monitoring server 30 stores the aggregated data and the identified pattern of events in electronic storage.

In the example illustrated, the monitoring server 30 receives a set of current event data for one or more events detected by one or more of the sensors within the property 10. The current event data includes the front door sensor 22 detecting that door opening at 8:00 AM, followed by no motion detection sensed by the motion sensor 24. The monitoring server 30 determines that the received event data matches the detected pattern of the daily opening of the front door at 8 AM followed by no activity. The monitoring server 30 generates a confidence score of 70% that is based the current event data received match the pattern of events identified. The system compares the generated confidence score to a confidence score threshold associated with a particular action. For example, the monitoring server 30 may determine that the confidence score of 70% does not exceed the threshold confidence score of 80 for sending a notification to a user associated with the property but does exceed the threshold confidence score of 60% for setting the HVAC system 603 to a cost saving setting, e.g., an "away mode." Based on the confidence score not exceeding the threshold confidence score for sending a notification to the user but exceeding the threshold confidence score for setting the HVAC system 603 to away mode, the monitoring server 30 does not send a notification to the user device of the user associated with the property but instructs the control panel 20 to have the HVAC system 603 set to away mode.

The confidence threshold assigned to the actions may be based on evaluating a cost versus convenience rating of performing the action. The system may consider the cost versus confidence factor when assigning a confidence threshold for an action along with the other factors considered for assigning a confidence threshold for a specific action. The cost versus convenience rating may vary based on the period of time the user is expected to be away from the property. For example, the cost versus convenience rating for changing the HVAC setting may be different if the user is expected to return home within the hour versus the user being expected to return home within five minutes. In the example illustrated, the user is expected to be outside the property for an extended period of time (approximately 9 hours) allowing the confidence threshold for changing the HVAC setting to be relatively low. The monitoring server determines that the confidence score exceeds the confidence threshold and communicates to the control panel to set the HVAC to the cost saving setting.

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
    obtaining historical event data for events detected over a past period of time by sensors within a property;
    receiving a set of current event data for one or more events detected by one or more of the sensors within the property;
    determining that the set of current event data matches a pattern of events indicated by the historical event data;
    generating, based on the pattern of events, a first confidence score for the set of current event data, wherein the first confidence score reflects a likelihood that the set of current event data matches the historical event data and a likelihood that additional event data will generate a higher confidence score;
    in response to waiting a predetermined amount of time, receiving the additional event data that indicates a person is not within the property;
    generating, based on the pattern of events and the additional event data that indicates the person is not within the property, a second confidence score;
    determining that the second confidence score satisfies a confidence threshold associated with an action to be performed when the person is not within the property, the first confidence score not satisfying the confidence threshold and the action being associated with at least one of an alarm system, an appliance, a camera system, or an HVAC system of the property; and
    in response to determining that the second confidence score satisfies the confidence threshold associated with the action to be performed when the person is not within the property, triggering execution of the action.

2. The computer-implemented method of claim 1, wherein the first confidence score is a low score to ensure that the execution of the action is not triggered until the additional event data is received.

3. The computer-implemented method of claim 1, wherein the second confidence score is higher than the first confidence score.

4. The computer-implemented method of claim 1, wherein the additional event data comprises at least one of location information corresponding to a device of the person, location information corresponding to a vehicle of the person, and weather data associated with weather at the property.

5. The computer-implemented method of claim 1, wherein in response to determining the second confidence score satisfies the confidence threshold associated with the action to be performed when the person is not within the property, triggering execution of the action comprises:
setting a temperature on the HVAC system at the property to a cost saving setting.

6. The computer-implemented method of claim 1, wherein in response to determining the second confidence score satisfies the confidence threshold associated with the action to be performed when the person is not within the property, triggering execution of the action comprises:
arming the alarm system at the property.

7. The computer-implemented method of claim 1, further comprising:
assigning the confidence threshold based on a cost benefit versus a convenience rating for triggering the execution of the action.

8. The computer-implemented method of claim 7, wherein the cost benefit versus the convenience rating further comprises:
adjusting a value of the confidence threshold based on the cost benefit versus the convenience rating based on a period of time the person is likely to be away from the property, wherein the value of the confidence threshold increases as the period of time the person is likely to be away from the property decreases.

9. A monitoring system that is configured to monitor a property, the monitoring system comprising:
a monitor control unit; and
one or more sensors that are located at the property, and are in communication with the monitor control unit,
wherein the monitor control unit is configured to:
obtaining historical event data for events detected over a past period of time by sensors within a property;
receiving a set of current event data for one or more events detected by one or more of the sensors within the property;
determining that the set of current event data matches a pattern of events indicated by the historical event data;
generating, based on the pattern of events, a first confidence score for the set of current event data, wherein the first confidence score reflects a likelihood that the set of current event data matches the historical event data and a likelihood that additional event data will generate a higher confidence score;
in response to waiting a predetermined amount of time, receiving the additional event data that indicates a person is not within the property;
generating, based on the pattern of events and the additional event data that indicates the person is not within the property, a second confidence score;
determining that the second confidence score satisfies a confidence threshold associated with an action to be performed when the person is not within the property, the first confidence score not satisfying the confidence threshold and the action being associated with at least one of an alarm system, an appliance, a camera system, or an HVAC system of the property; and
in response to determining that the second confidence score satisfies the confidence threshold associated with the action to be performed when a person is not within the property, triggering execution of the action.

10. The monitoring system of claim 9, wherein the first confidence score is a low score to ensure that the execution of the action is not triggered until the additional event data is received.

11. The monitoring system of claim 9, wherein the second confidence score is higher than the first confidence score.

12. The monitoring system of claim 9, wherein the additional event data comprises at least one of location information corresponding to a device of the person, location information corresponding to a vehicle of the person, and weather data associated with weather at the property.

13. The monitoring system of claim 9, wherein in response to determining the second confidence score satisfies the confidence threshold associated with the action to be performed when the person is not within the property, triggering execution of the action comprises:
setting a temperature on the HVAC system at the property to a cost saving setting.

14. The monitoring system of claim 9, wherein in response to determining the second confidence score satisfies the confidence threshold associated with the action to be performed when the person is not within the property, triggering execution of the action comprises:
arming the alarm system at the property.

15. The monitoring system of claim 9, further comprising:
assigning the confidence threshold based on a cost benefit versus a convenience rating for triggering the execution of the action.

16. The monitoring system of claim 15, wherein the cost benefit versus the convenience rating further comprises:
adjusting a value of the confidence threshold based on the cost benefit versus the convenience rating based on a period of time the person is likely to be away from the property, wherein the value of the confidence threshold increases as the period of time the person is likely to be away from the property decreases.

17. A non-transitory computer-readable medium encoded with a computer program, the computer program comprising instructions that when executed by one or more computers cause the one or more computers to perform operations comprising:
obtaining historical event data for events detected over a past period of time by sensors within a property;
receiving a set of current event data for one or more events detected by one or more of the sensors within the property;
determining that the set of current event data matches a pattern of events indicated by the historical event data;
generating, based on the pattern of events, a first confidence score for the set of current event data, wherein the first confidence score reflects a likelihood that the set of current event data matches the historical event data and a likelihood that additional event data will generate a higher confidence score;
in response to waiting a predetermined amount of time, receiving the additional event data that indicates a person is not within the property;
generating, based on the pattern of events and the additional event data that indicates the person is not within the property, a second confidence score;
determining that the second confidence score satisfies a confidence threshold associated with an action to be performed when the person is not within the property, the first confidence score not satisfying the confidence threshold and the action being associated with at least one of an alarm system, an appliance, a camera system, or an HVAC system of the property; and in response to determining that the second confidence score satisfies the confidence threshold associated with the action to be performed when a person is not within the property, triggering execution of the action.

18. The computer-readable medium of claim 17, wherein the first confidence score is a low score to ensure that the execution of the action is not triggered until the additional event data is received.

19. The computer-readable medium of claim 17, wherein the second confidence score is higher than the first confidence score.

20. The computer-readable medium of claim 17, wherein the additional event data comprises at least one of location information corresponding to a device of the person, location information corresponding to a vehicle of the person, and weather data associated with weather at the property.

* * * * *